United States Patent
Cardona et al.

(10) Patent No.: US 6,926,507 B2
(45) Date of Patent: Aug. 9, 2005

(54) BLOWING AGENT DELIVERY SYSTEM

(75) Inventors: Juan C. Cardona, Lowell, MA (US); Kevin J. Levesque, Andover, MA (US); Theodore A. Burnham, Melrose, MA (US); Alan F. Matthieu, Fitchburg, MA (US); Roland Y. Kim, Andover, MA (US)

(73) Assignee: Trexel, Inc., Woburn, MA (US)

(*) Notice: Subject to any disclaimer, the term of this patent is extended or adjusted under 35 U.S.C. 154(b) by 357 days.

(21) Appl. No.: 09/782,673

(22) Filed: Feb. 13, 2001

(65) Prior Publication Data

US 2001/0033040 A1 Oct. 25, 2001

Related U.S. Application Data

(60) Provisional application No. 60/187,530, filed on Mar. 7, 2000.

(51) Int. Cl.[7] .............................................. B29C 44/60
(52) U.S. Cl. ...................... 425/4 R; 425/4 C; 425/135; 425/143; 425/557
(58) Field of Search ................................ 425/4 C, 4 R, 425/135, 143, 148, 557

(56) References Cited

U.S. PATENT DOCUMENTS

| | | |
|---|---|---|
| 3,686,388 A | 8/1972 | Beckmann et al. |
| 3,697,204 A | 10/1972 | Kyritsis et al. |
| 3,793,416 A | 2/1974 | Finkmann et al. |
| 3,981,649 A | 9/1976 | Shimano et al. |
| 4,043,715 A | 8/1977 | Hendry |
| 4,124,336 A | 11/1978 | Johnson |
| 4,211,523 A | 7/1980 | Hunerberg |
| 4,344,710 A | 8/1982 | Johnson et al. |
| 4,381,272 A | 4/1983 | Ehritt |
| 4,424,287 A | 1/1984 | Johnson et al. |
| 4,470,938 A | 9/1984 | Johnson |
| 4,473,665 A | 9/1984 | Martini-Vvedensky et al. |
| 4,783,292 A | 11/1988 | Rogers |
| 5,047,183 A | 9/1991 | Eckardt et al. |

(Continued)

FOREIGN PATENT DOCUMENTS

| | | |
|---|---|---|
| EP | 0 486 957 A1 | 5/1992 |
| EP | 0 843 246 A2 | 11/1997 |
| EP | 0 615 830 B1 | 12/1997 |
| EP | 0 972 626 A2 | 1/2000 |
| KR | 2000-0032383 | 6/2000 |
| WO | WO 98/08667 A3 | 3/1998 |
| WO | WO 98/31521 A2 | 7/1998 |
| WO | WO 99/32544 A1 | 7/1999 |

OTHER PUBLICATIONS

International Search Report for Corresponding PCT Application (PCT/US01/05542).

Primary Examiner—Allan R. Kuhns
(74) Attorney, Agent, or Firm—Wolf, Greenfield & Sacks, P.C.

(57) ABSTRACT

The invention provides a blowing agent delivery system for introducing a blowing agent into a polymeric foam processing system. The delivery system is designed to discontinuously introduce blowing agent from a continuous source into polymeric material within an extruder. The system, thus, may improve control over blowing agent delivery in discontinuous polymer processing systems such as injection molding or blow molding. In some embodiments, the blowing agent delivery system selectively directs blowing agent flow from the source to the extruder barrel, or through a bypassing passageway. In this manner, blowing agent may be continuously supplied by the source but discontinuously injected into the extruder barrel. During use, the delivery system may cause blowing agent to flow through the bypassing passageway, for example, when the screw stops plasticating polymeric material.

59 Claims, 7 Drawing Sheets

U.S. PATENT DOCUMENTS

| | | | |
|---|---|---|---|
| 5,098,267 A | 3/1992 | Cheng | |
| 5,120,559 A | 6/1992 | Rizvi et al. | |
| 5,154,088 A | 10/1992 | Lehnert et al. | |
| 5,158,986 A | 10/1992 | Cha et al. | |
| 5,160,674 A | 11/1992 | Colton et al. | |
| 5,328,651 A | 7/1994 | Gallagher et al. | |
| 5,334,356 A | 8/1994 | Baldwin et al. | |
| 5,866,053 A | 2/1999 | Park et al. | |
| 6,005,013 A | 12/1999 | Suh et al. | |
| 6,051,174 A | 4/2000 | Park et al. | |
| 6,169,122 B1 | 1/2001 | Blizard et al. | |
| 6,231,942 B1 | 5/2001 | Blizard et al. | |
| 6,235,380 B1 | 5/2001 | Tupil et al. | |
| 6,284,810 B1 | 9/2001 | Burnham et al. | |
| 6,287,494 B1 | 9/2001 | Clarke | |
| 6,294,115 B1 | 9/2001 | Blizard et al. | |
| 6,322,347 B1 | 11/2001 | Xu | |
| 6,328,916 B1 | 12/2001 | Nishikawa et al. | |
| 6,376,059 B1 | 4/2002 | Anderson et al. | |
| 6,451,230 B1 | 9/2002 | Eckardt et al. | |
| 6,579,910 B2 | 6/2003 | Xu | |
| 6,593,384 B2 | 7/2003 | Anderson et al. | |
| 6,602,063 B1 | 8/2003 | Cardona | |
| 6,613,811 B1 | 9/2003 | Pallaver et al. | |
| 6,616,434 B1 | 9/2003 | Burnham et al. | |

BLOWING AGENT DELIVERY SYSTEM

RELATED APPLICATIONS

This application claims priority to U.S. Provisional Patent Application Ser. No. 60/187,530, filed Mar. 7, 2000.

FIELD OF THE INVENTION

The present invention relates generally to polymer foam processing and, more particularly, to a system for delivering a blowing agent in a polymeric foam process.

BACKGROUND OF THE INVENTION

Polymeric materials are processed using a variety of techniques. Many techniques employ an extruder which plasticates polymeric material by the rotation of a processing screw within a barrel. Some processing techniques, such as injection molding or blow molding, are discontinuous. That is, during operation, the screw does not plasticate polymeric material continuously. For example, the screw may stop rotating after a charge of polymeric material mixed with blowing agent is accumulated downstream of the screw, and thus cease to plasticate polymeric material, as well as during an injection molding cycle when the screw moves in a downstream direction to inject polymeric material into a mold.

Polymeric foam materials, including microcellular materials, can be processed by injecting a physical blowing agent into the polymeric material within the barrel. Many conventional blowing agent delivery systems inject blowing agents continuously into the polymeric material within the barrel. In discontinuous processes, such continuous delivery systems may prevent control over the percent blowing agent injected into the polymeric material and may lead to an uneven distribution of the blowing agent in the polymeric melt. In particular, the polymeric material in the vicinity of the blowing agent port, when the screw ceases to plasticate polymeric material, may contain higher amounts of blowing agent because of its increased residence time in proximity with the blowing agent injection port. The uneven distribution of blowing agent may result in viscosity variations within the polymeric material which can cause output inconsistencies in the extruder and other problems. Such effects reduce control over the process and narrow the processing window.

In some polymer processes including some discontinuous processes, such conventional blowing agent delivery systems may be adequate. However, in other processes such as discontinuous processes that require relatively precise control over blowing agent delivery, the conventional systems may reduce the effectiveness of the process. For example, certain processes for producing microcellular material may be adversely effected if the blowing agent is not precisely controlled.

Accordingly, a need exists for a system that delivers blowing agent in a controlled manner to a discontinuous polymer processing system.

SUMMARY OF THE INVENTION

The invention provides a blowing agent delivery system for introducing a blowing agent into a polymeric foam processing system. The delivery system is designed to discontinuously introduce blowing agent from a continuous source into polymeric material within an extruder. The system, thus, may improve control over blowing agent delivery in discontinuous polymer processing systems such as injection molding or blow molding systems. In some embodiments, the blowing agent delivery system selectively directs blowing agent flow from the source either to the extruder barrel, or through a bypassing passageway. In this manner, blowing agent may be continuously supplied by the source but discontinuously injected into the extruder barrel. During use, the delivery system may cause blowing agent flow through the bypassing passageway, for example, when the screw stops plasticating polymeric material.

In one aspect, the invention provides a system for injecting a blowing agent into polymeric material within a barrel of a polymer processing apparatus. The system includes a conduit having an inlet connectable to a source of blowing agent and an outlet connectable to a port in the barrel to provide a pathway through which blowing agent flows from the source to the polymeric material within the barrel. The system further includes a flow controlling system including a bypassing passageway fluidly connected to the conduit at a position between the inlet and the outlet. The flow controlling system is designed to selectively direct blowing agent flow from the source to the polymeric material in the barrel or through the bypassing passageway.

In another aspect, the invention provides a method of injecting blowing agent into a barrel of a polymer processing apparatus. The method includes continuously supplying blowing agent at a constant flow rate from a blowing agent source connected to the barrel of a polymer processing apparatus while discontinuously injecting the blowing agent from the source into the barrel.

Among other advantages, the blowing agent injection system can introduce blowing agent in a controlled and uniform manner into a discontinuous polymer processing system. This promotes an even distribution of a selected amount of blowing agent in the polymeric melt, for example based on the weight of polymeric material, throughout the process even when the process is discontinuous. This significantly reduces or prevents viscosity variations which may arise in conventional blowing agent delivery systems that continuously introduce blowing agent into a discontinuous processing system. Reduction of such viscosity variations generally broadens the processing window (i.e., acceptable variations in pressure and temperature), prevents output inconsistencies of the extruder, and produces a more consistent and controllable product. The blowing agent injection systems according to the invention are particularly useful in processes that benefit from the precise control of the metering of blowing agent into the polymeric melt, such as certain processes for producing microcellular material.

The blowing agent injection system may be used to deliver a wide range of blowing agents including gases, liquids, and supercritical fluids. Furthermore, the blowing agent injection system may inject blowing agents with a high mass flow consistency over a broad range of pressures including high pressures in the range of between 500 psi and 5000 psi, or even greater.

Other advantages, aspects, and features of the invention will become apparent from the following detailed description of the invention when considered in conjunction with the accompanying drawings.

DETAILED DESCRIPTION

The invention provides a blowing agent delivery system for use in polymeric foam material processing. The system may be used to introduce blowing agent from a continuous source into a discontinuous polymeric processing system, such as an injection molding or blow molding apparatus. The blowing agent delivery system is particularly useful when used in conjunction with discontinuous processes that require relatively accurate control over the metering of blowing agent, such as certain processes for producing microcellular material.

Figure 1:
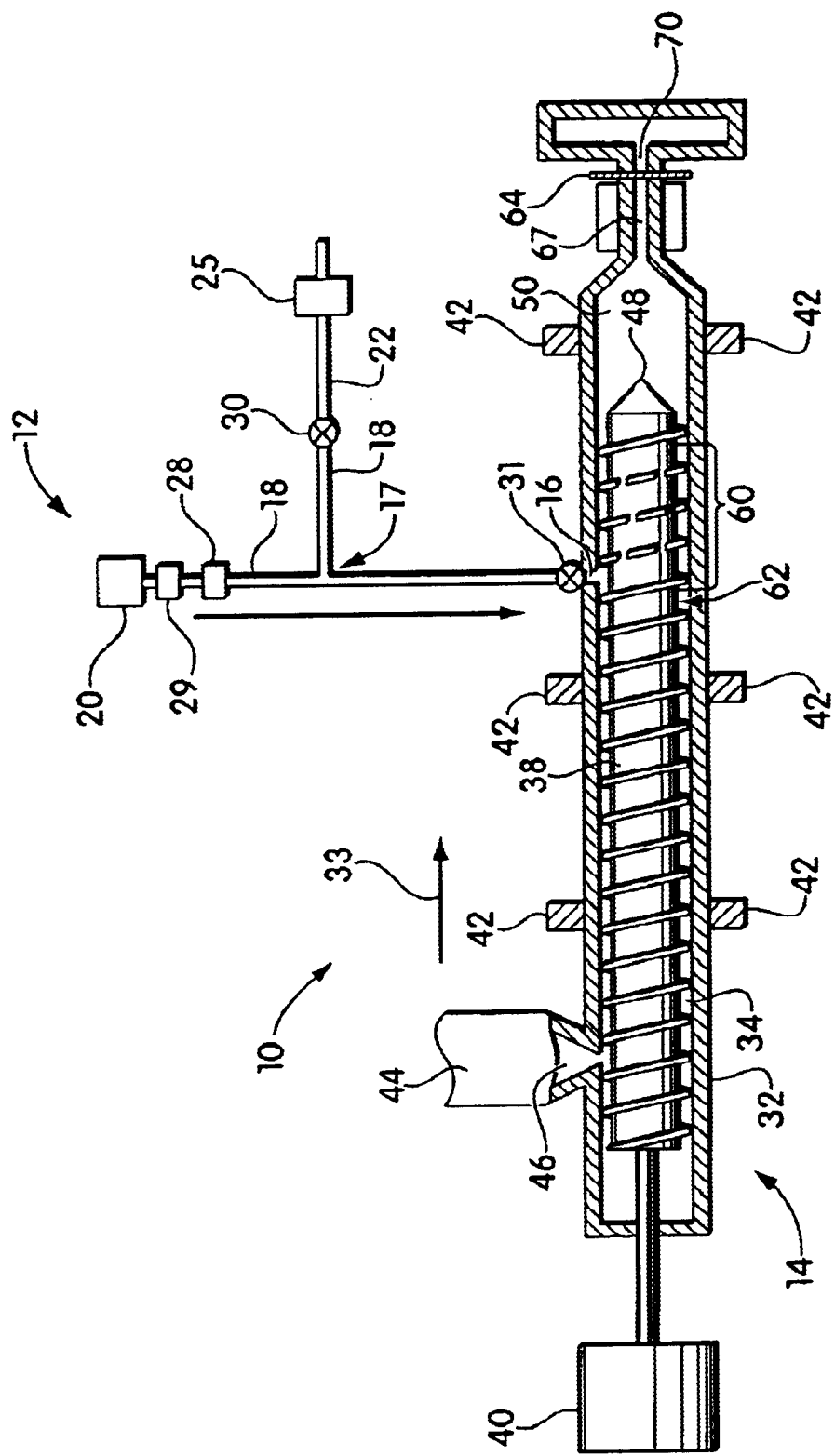
FIG. 1 schematically illustrates one embodiment of a blowing agent delivery system according to the invention showing the introduction of blowing agent into the extruder barrel while the extruder plasticates polymeric material.
Figure 2:
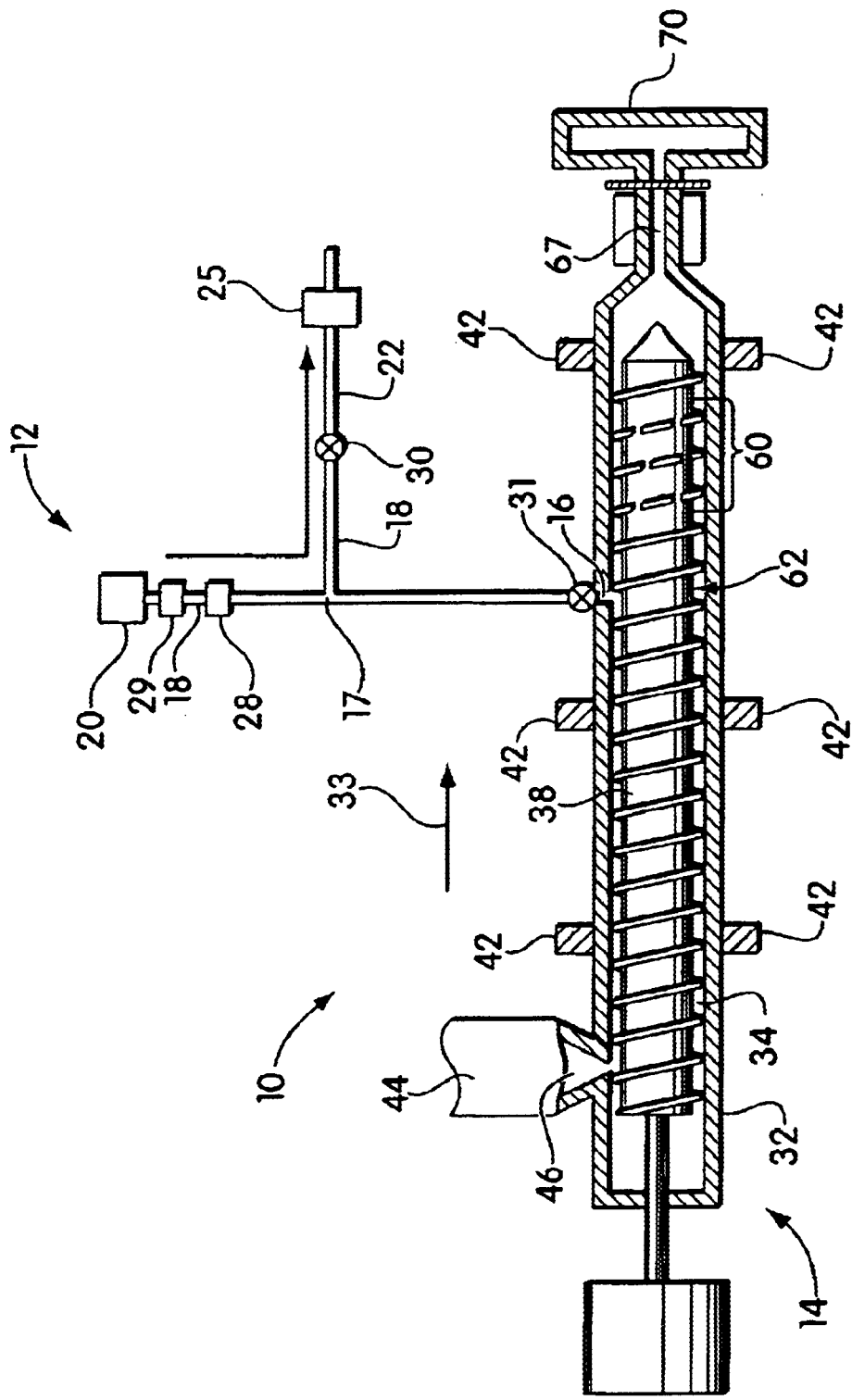
FIG. 2 schematically illustrates the blowing agent delivery system of FIG. 1 showing the blowing agent being diverted from the extruder barrel via a bypassing passageway when the extruder has stopped plasticating polymeric material.

Referring to FIGS. 1 and 2, one illustrative embodiment of the blowing agent delivery system according to the invention is shown schematically in conjunction with an injection molding system 10. The injection molding system includes an extruder 14 having a screw 38 mounted in a barrel 32 to define therebetween a polymer processing space 34 through which polymeric material may be conveyed in a downstream direction 33. A blowing agent flow control system 12 is designed to selectively introduce blowing agent from a source 20 into the polymeric material in the extruder thereby forming a polymer/blowing agent mixture in the processing space. In one mode of operation, typically which occurs when the screw is plasticating polymeric material (i.e. when the screw rotates), system 12 causes blowing agent to flow through a conduit 18 connected to a blowing agent port 16 in the barrel and into the polymeric material (FIG. 1). In a second mode of operation, typically which occurs when the screw is no longer plasticating polymeric material (i.e. when the screw is idle), system 12 directs the blowing agent flow from the source through a bypassing passageway 22 connected to the conduit upstream of port 16 (FIG. 2) at a junction 17. As described further below, a bypass valve 30, in the bypassing passageway downstream of the junction 17, and a shut-off valve 31, positioned between the junction and the port, operate to control the direction of blowing agent flow in this particular embodiment.

Injection molding system 10 may be any of the type known in the art. Examples of suitable injection molding systems have been described, for example, in International Publication No. WO 98/31521 (Pierick et. al.) which is incorporated herein by reference. In this illustrative example, polymeric material, typically in pelletized form, is fed into barrel 32 from hopper 44 through an orifice 46. Barrel 32 may be equipped with temperature control units 42 at selective positions along the length of the barrel. Temperature control units may be used to heat the stream of pelletized or fluid polymeric material within the extrusion barrel to facilitate melting, and/or to cool the stream to control viscosity, for example. During an injection molding cycle, system 10 accumulates a charge of a mixture of polymeric material and blowing agent in a region 50 downstream of screw 38 and injects the accumulated charge into a mold 70 positioned downstream of the extruder and fluidly connected to the polymer processing space via a pathway 67. After a sufficient cooling time, the mold is opened to yield a molded foam article. The cycle is typically repeated to produce additional molded articles. In preferred microcellular embodiments, as described in International Patent Publication No. WO98/31521, a homogeneous, single-phase solution of polymeric material and blowing agent is accumulated in region 50 and is nucleated as the charge is injected into the mold. A molded microcellular article is formed within the mold.

Though blowing agent delivery system 12 is illustrated in conjunction with an injection molding system, it is to be understood that the blowing agent delivery system according to the invention may be used in conjunction with any polymer processing system including continuous systems, such as extrusion systems, or other discontinuous systems, such as blow molding systems. Examples of suitable extrusion systems have been described, for example, in International Publication No. WO 98/08667 and in corresponding U.S. patent application Ser. No. 09/258,625 (Burnham et. al.) each incorporated herein by reference. Examples of suitable blow molding systems have been described, for example, in International Publication No. WO 99/32544 (Anderson et. al.) which is incorporated herein by reference. In blow molding embodiments, microcellular material can be produced by accumulating a homogeneous, single-phase solution of polymeric material and blowing agent in region 50 and nucleating the solution while ejecting the charge from the region through an annular orifice forming a microcellular parison.

In other embodiments (not shown) of blow molding or injection molding, a separate accumulator is fluidly connected to the extruder barrel and a charge of polymeric material and blowing agent, preferably a homogeneous, single-phase solution, is accumulated therein and injected into a mold or extruded through an orifice to form a parison.

At the beginning of the molding cycle, the screw is in an accumulation mode and rotates within barrel 32 to plasticate polymeric material and convey the material in a downstream direction 33 (FIG. 1). As described above, typically, delivery system 12 injects blowing agent into the polymeric material in the extruder as the screw is plasticating polymeric material to form a mixture of polymeric material and blowing agent in polymer processing space 34. A flow controlling system includes bypassing passageway 22, conduit 18, and a variety of combinations of shut-off valves, pressure regulators, and/or check valves arranged to selectively direct blowing agent flowing from the source to the polymeric material within the barrel or, alternatively, through the bypassing passageway. One such arrangement is shown in FIG. 1, and will now be described. To permit the flow of blowing agent out of conduit 18 through port 16 and into the polymeric material in the extruder, shut-off valve 31 is placed in an "open" position which allows the flow of blowing agent therepast and, generally, bypassing shut-off valve 30 is placed in a "closed" position to prevent flow of blowing agent through the bypassing passageway. The screw remains in the accumulation mode and plasticates polymeric material until a sufficient charge of the polymeric material and blowing agent mixture has been accumulated in region 50. At this time, screw 38 stops rotating and, thus, no longer plasticates or conveys polymeric material. Then, the screw moves in downstream direction 33 to inject the accumulated charge into mold 70 (FIG. 2). When it is desired to cease delivery of blowing agent into the barrel, for example when or before plastication ceases, blowing agent delivery system 12 is designed to prevent the flow of blowing agent into the polymeric material by opening bypassing shut-off valve 30 and closing shut-off valve 31, thus diverting the flow of blowing agent from the source through bypassing passageway 22.

In many embodiments, the operation of the valve 30 and valve 31 are coupled so that when valve 31 is in the open position, valve 30 is in the closed position and vice-versa. The operation of the bypass valve and shut-off valve may also be coupled to the screw in some embodiments. In these embodiments, the valves may be open or shut depending upon screw position, whether the screw is rotating or idle and/or based upon time. For example, when screw 38 is in the accumulation position and rotating, valve 30 is closed and valve 31 is open and when the screw is in the injection position and idle, bypass valve is open and shut-off valve is closed. A controller (not shown) can be provided to set the position of valves, or the pressure tolerance of back-pressure regulators according to any of the arrangements described herein or arrangements that would be known to be appropriate for use by those of ordinary skill in the art of polymer processing. Controllers can include manual switches, electromechanical circuitry, computer processors, and the like, and are readily designable by those of ordinary skill in the art to achieve the objects of the invention.

Bypassing shut-off valve 30 may be positioned anywhere along bypassing passageway 22 at or downstream of junction 17. It is generally preferable that the location of 31 be relatively close to blowing agent port 16. It is also generally preferably that the entire volume of conduits defining system 12 be minimized. It is most preferable that the interior volume of conduits bounded by valve 31, valve 30, and a pressure regulator 28 (described below) be minimized. A pressure regulator 28 may be provided within the pathway of conduit 18 upstream of junction 17 to help maintain a constant pressure which facilitates the accurate metering of blowing agent. That is, it is preferable that the distance between valve 30 and junction 17, valve 31 and junction 17, and regulator 28 and junction 17 be minimized. Where valve 30 is replaced by a pressure regulator (described more fully below) then the pressure regulator defines the boundary of conduit volume that is ideally minimized, as discussed. In preferred embodiments, the volume of conduits of system 12 bounded by valve 31, valve 30 (or a replacement pressure regulator), and pressure regulator 28 is less than about 100 $cm^3$, more preferably less than about 10 $cm^3$, more preferably less than about 1 $cm^3$.

Figure 1A:
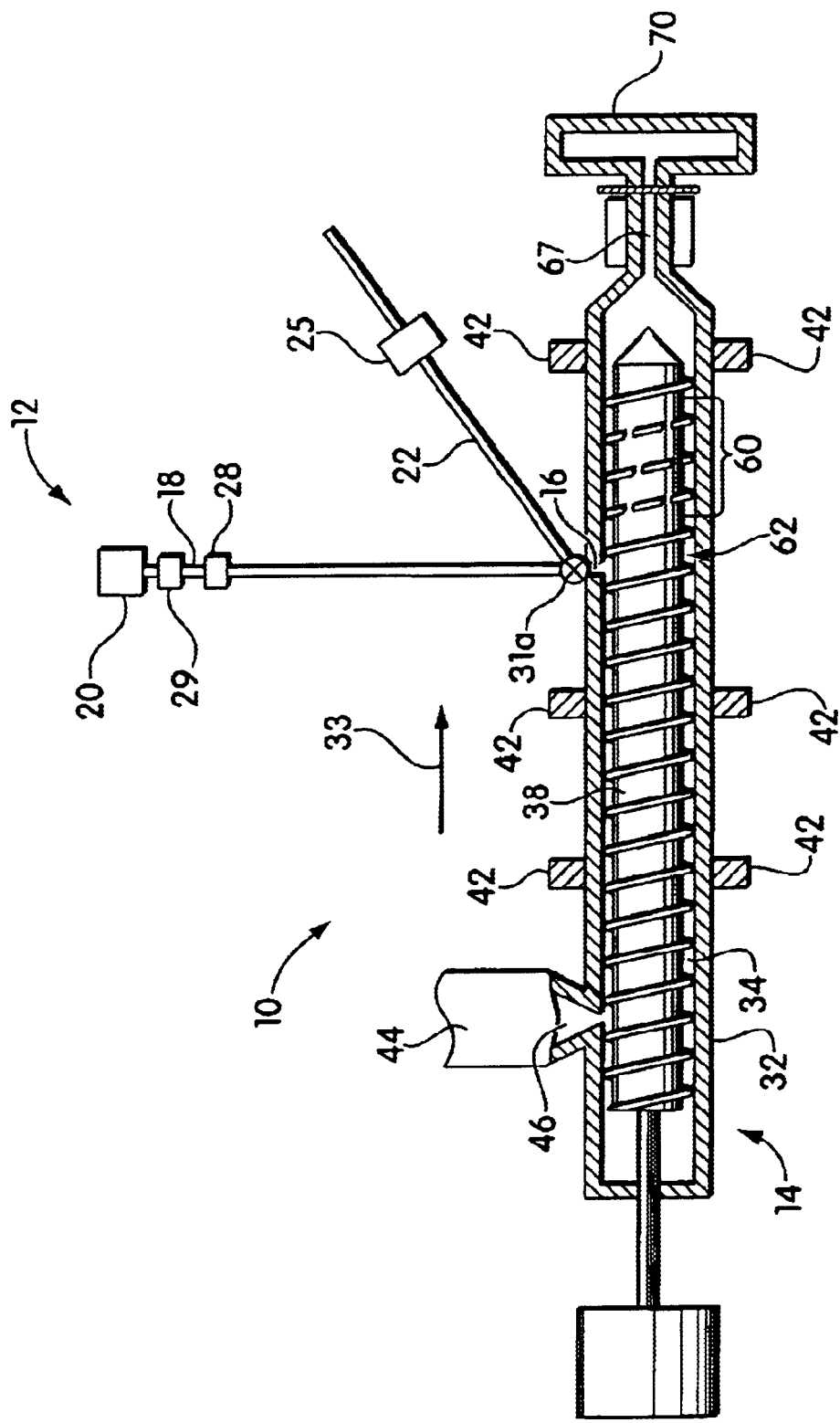
FIG. 1A schematically illustrates the blowing agent delivery system of FIG. 1 in which a two-way valve adjacent the extruder barrel selectively directs blowing agent into the extruder barrel or through a bypassing passageway.

In one embodiment, illustrated in FIG. 1A, valve 31 is not a shut-off valve but is a two-way valve 31a switchable between a first position allowing blowing agent to flow from the source into the barrel and a second position diverting blowing agent through bypassing passageway 22. That is, bypassing passageway is connected directly to the valve. This helps to minimize the volume within system 12 as described above (FIG. 1) by effectively completely eliminating any volume between valves 30 and 31 (valve 31a, when a two-way valve, serves both functions of valves 30 and 31 described above).

In most embodiments, the fluid pathway distance between valve 30 or 31a and blowing agent port 16 is less than 10 feet, in some embodiments less than 5 feet, in some embodiments less than 1 foot, and in some embodiments less than 6 inches away from blowing agent port 16 or even closer. The term "fluid pathway distance" as used herein means the distance a fluid travels between two reference points.

Valve 31 may be positioned at any point downstream of junction 17 but, preferably, is located very close to blowing agent port 16. Where valve 31a is used (FIG. 1A) defining a two-way valve, it also is located ideally very close to blowing agent port 16. For example, in some embodiments the fluid pathway distance d between the valve 31 or 31a and an outlet 67 (See FIG. 5) of the blowing agent port 16 may be less than 6 inches, in others less than 3 inches, in others less than 2 inches, and in others less than 1 inch. In particularly preferred embodiments, valve 31 or 31a is positioned essentially adjacent the blowing agent port 16. As described more fully below, positioning the valve "essentially adjacent" the blowing agent port means positioning the valve as close as possible to the polymer flowing within the extruder without compromising the ability of the valve to function. Specifically, in this embodiment, the valve typically is located at least partially within an opening defining the wall of the extruder. By decreasing the fluid pathway distance, the enclosed volume of blowing agent between the shut-off valve and outlet of the blowing agent is reduced. This advantageously reduces the residual blowing agent injected into the polymeric material after the valve is closed which increases the accuracy of blowing agent delivery. In some embodiments, the enclosed volume between the valve 31 or 31a and the outlet of the blowing agent port may be less than 5.0 $cm^3$, in others less than 1.0 $cm^3$, in others less than 0.10 $cm^3$, and in others less than 0.05 $cm^3$. In some embodiments particularly useful for reducing the fluid pathway distance and the enclosed volume between the valve 31 or 31a and the outlet of the blowing agent port, the valve and the blowing agent port may be part of the same assembly, as described further below and illustrated in FIG. 6.

Bypassing shut-off valve 30 and shut-off valve 31 may be any device in the art that selectively permits flow of pressurized gas, liquefied gas, or supercritical fluid therethrough in one configuration, and prevents flow of these fluids therethrough in another configuration. Suitable types of valves include solenoid, spool or other equivalent valves. In some cases, valves 30 and 31 may be the same type, while in other cases the valves may be of different types. Where two-way valve 31a, is used (FIG. 1A), the two-way valve can be a solenoid, spool or any other type of two-way valve known in the art.

Figure 3:
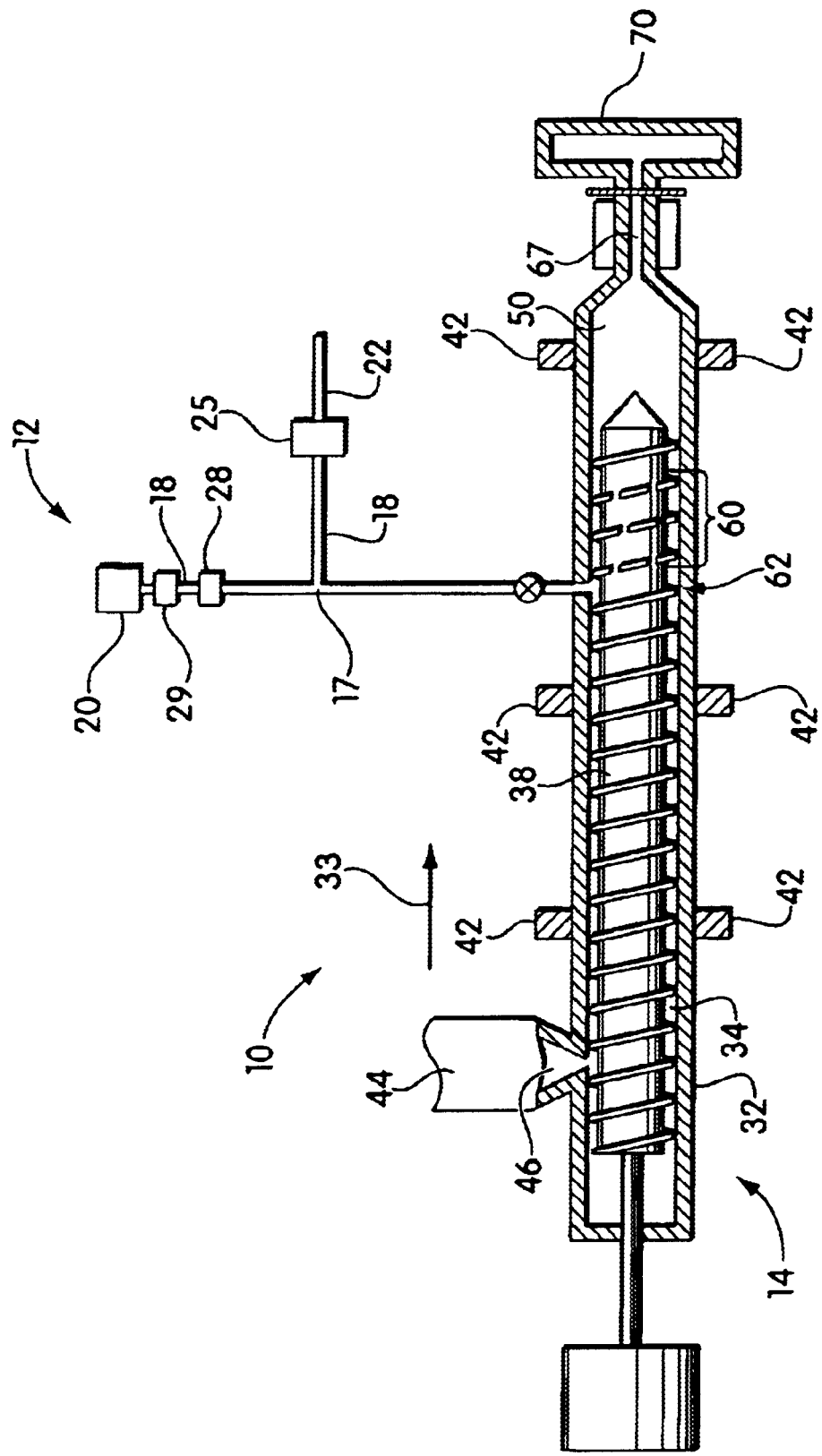
FIG. 3 schematically illustrates another embodiment of the blowing agent delivery system with a pressure regulator controlling the flow of blowing agent in the bypassing passageway.

The bypassing passageway may include a back-pressure regulator 25, as illustrated, to maintain a selected pressure in the system upstream of regulator 25 when valve 30 is open (in embodiments in which valve 30 is included; in another embodiment, described in FIG. 3, valve 30 is replaced by regulator 25 rather than being complemented by regulator 25). The regulator may be any of the type known in the art, and is useful in certain embodiments in which it is advantageous to maintain the pressure in the system at a predetermined level relative to the pressure in the extruder, typically a pressure approaching, similar to, or slightly greater than the pressure in the extruder in the vicinity of the port when the screw is plasticating polymeric material, which generally is in the range of 500 psi and 4000 psi but is dependent upon the process. This causes the bypassing passageway and the barrel to have a similar resistance to blowing agent flow. Thus, when the blowing agent delivery system changes the pathway of the blowing agent from the bypassing passageway to the barrel, or vice-versa, the flow rate remains relatively constant. This may increase the accuracy and consistency of the rate at which blowing agent is introduced into the polymeric material which promotes uniformity of the blowing agent and polymer mixture.

In the illustrative embodiment, the bypassing passageway opens to the atmosphere thus the blowing agent escapes to the environment when diverted from the source. Oftentimes, blowing agents are relatively inexpensive so that the costs associated with the escaping blowing agent are insignificant. Furthermore, blowing agents preferred for use in this invention are environmentally friendly and may be safely released to the atmosphere. But in any situation in which it is desirable to collect shunted blowing agent, the bypassing passageway may be connectable to a storage tank or similar apparatus for collecting and/or processing the blowing agent. In still other embodiments, the bypassing passageway may be connectable to the blowing agent source so that the blowing agent diverted from the source may be recycled, e.g., returned to the source or storage.

Blowing agent source 20 may supply any type of physical blowing agent known to those of ordinary skill in the art including nitrogen, carbon dioxide, hydrocarbons, chlorofluorocarbons, nobel gases and the like, or mixtures thereof. The blowing agent may be supplied in any flowable physical state, for example, a gas, liquid, or supercritical fluid. According to one preferred embodiment, source 20 provides carbon dioxide as a blowing agent. In another preferred embodiment, source 20 provides nitrogen as a blowing agent. In certain embodiments, solely carbon dioxide or nitrogen is used. Blowing agents that are in the supercritical fluid state after injection into the extruder, (and, optionally, before injection as well) in particular supercritical carbon dioxide and supercritical nitrogen, are especially preferred in certain embodiments.

Source 20, in many embodiments, supplies blowing agent to the conduit continuously. The source may include a pump (not illustrated) for delivering the blowing agent to the conduit at elevated pressures. A metering device 29 may be connected to an outlet of source 20 to monitor and control the flow rate of blowing agent supplied by the source to conduit 18. Metering device 29 may be any of the type known in the art and in some embodiments meters the mass flow rate of the blowing agent. In these embodiments, the mass flow rate of the blowing agent supplied to the conduit by the source may be varied over a wide range as required by the particular process. For example, the blowing agent mass flow rate is generally between about 0.001 lbs/hr and 100 lbs/hr, in some cases between about 0.002 lbs/hr and 60 lbs./hr, and in some cases between about 0.02 lbs./hr and about 10 lbs./hr. As described further below, the blowing agent is introduced through port 16 into the polymeric material in the extruder so as to maintain a weight percentage of blowing agent depending on the particular process. In general, the blowing agent level is generally less than about 15% by weight of polymeric material and blowing agent mixture. In many embodiments, the blowing agent level is less than about 8%, and others less than about 5%, in others less than about 3%, in others less than about 1%, and still others less than about 0.1% or even lower percent by weight of polymeric material and blowing agent mixture.

Conduits of the system including conduit 18 and bypassing passageway 22 may be any of the type known in the art suitable for transporting a blowing agent. For example, conduit 18 may be a tube made of any material known in the art suitable for transporting pressurized gas, liquefied gas, and/or supercritical fluid, such as a metal tube, preferably stainless steel. The conduits also could be defined by passageways within a block of material, such as drilled passageways within a block of metal such as stainless steel. The blowing agent passageways typically have a cross-sectional diameter in the range of from about 1 cm to about 0.1 mm. As mentioned above, volume within conduits of system 12 preferably is minimized, thus even smaller diameter conduits are preferred in many cases. The length and configuration of conduit 18 is not constrained and generally depends upon factors such as available manufacturing space, and the layout of the polymer processing system. Conduit 18, in some embodiments and as illustrated, may have one or more branches, for example, to facilitate connection to the bypass valve.

Figure 5:
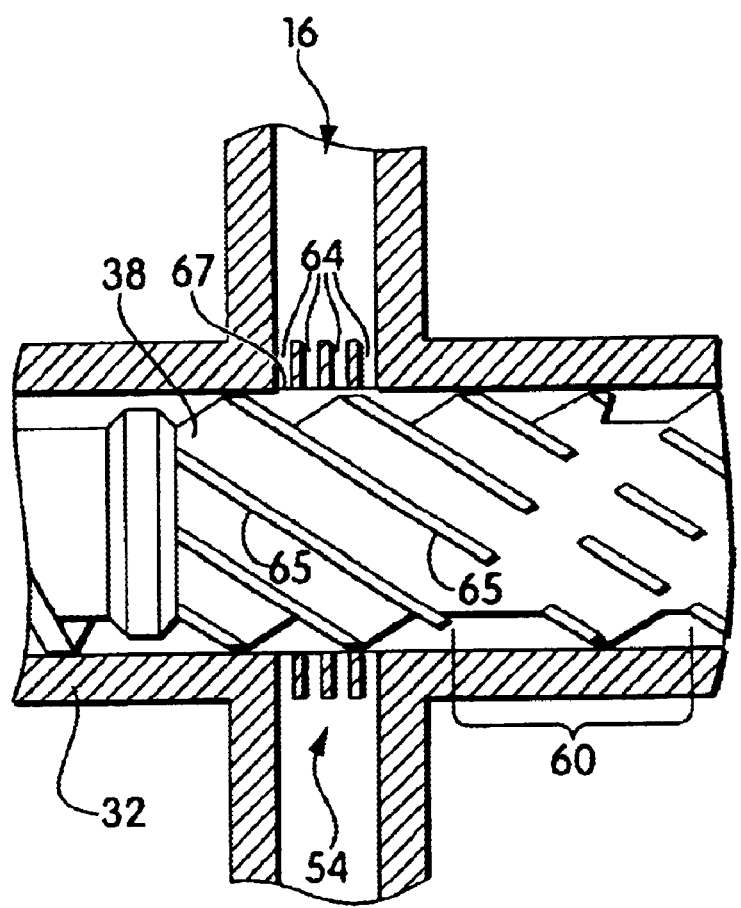
FIG. 5 schematically illustrates a multi-hole blowing agent injection port according to one embodiment of the present invention.

Blowing agent injection port 16 may be a single port or a plurality of ports arranged in the barrel. When multiple ports are utilized, ports can be arranged radially about the barrel or in a linear fashion along the screw path. Ports arranged along the length of the barrel can facilitate injection of blowing agent at a relatively constant location relative to the screw, which moves approximately within the barrel as an accumulated charge is formed in region 50. In this arrangement, a separate shut-off valve 31 can be provided at each location along the barrel at which blowing agent can be injected. The valves can be opened and closed so as to control injection of blowing agent at desired location relative to the position of the screw. These valves can be controlled as a function of time or position. Where radially-arranged ports are used, a plurality of ports 16 may be placed at the 12:00 o'clock, 3:00 o'clock, 6:00 o'clock and 9:00 o'clock positions about the extruder barrel, or in any other configuration as desired. As illustrated in FIG. 5, port 16 may include a plurality of orifices 64 connecting the blowing agent source with the extruder barrel. Although, in other embodiments, port 16 may include a single orifice. In the multi-orifice port embodiment, where each orifice 64 is considered a blowing agent orifice, the port may include at least about 2, and some cases at least about 4, and others at least about 10, and others at least about 40, and others at least about 100, and others at least about 300, and others at least about 500, and in still others at least about 700 blowing agent orifices. In another embodiment port 16 includes an orifice containing a porous material that permits blowing agent to flow through a variety of pores and into the barrel, without the need to machine a plurality of individual orifices.

In certain preferred embodiments, blowing agent port 16 may be located at a blowing agent injection section 62 of the screw when the screw is arranged in the barrel in the accumulation mode. The blowing agent injection section of the screw may include full, unbroken flight paths. In this manner, each flight, passes or "wipes" the blowing agent port including orifices periodically, when the screw is rotating. This wiping increases rapid mixing of blowing agent and polymeric material in the extruder the result is a distribution of relatively finely divided, isolated regions of blowing agent in the polymeric material immediately upon injection into the barrel and prior to any mixing. This promotes formation of a uniform polymer and blowing agent mixture which may be desired in certain types of polymeric processing including microcellular processing. Downstream of the blowing agent injection section, the screw may include a mixing section 60 which has highly broken flights to further mix the polymer and blowing agent mixture to promote formation of a uniform mixture. A preferred uniform mixture is a homogeneous, single-phase solution.

Referring to FIG. 3, an alternative embodiment of the blowing agent delivery system according to the invention is shown schematically. In this illustrative embodiment, blowing agent delivery system 12 includes a pressure regulator 25, but not bypassing shut-off valve 30, for controlling the flow of blowing agent through bypassing passageway 22. Back-pressure regulator 25 is designed to provide a resistance to blowing agent flow greater than the pressure in the extruder when the screw is plasticating polymeric material in the accumulation position. Because of the lower pressure condition in the extruder, blowing agent will preferentially flow through conduit 18 and into the polymeric material in the extruder when valve 31 is open, as opposed to flowing through bypassing passageway 22. When shut-off valve 31 is closed, blowing agent is prevented from flowing into the extruder, and pressure of the blowing agent in conduit 18 increases to a pressure above that restricted by pressure regulator 25. Thus, blowing agent flows through the pressure regulator and the bypassing passageway 22 and is diverted from the extruder. A controller (not shown) can adjust resistance provided by back-pressure regulator 25 responsive to changing conditions within the extruder.

Figure 4:
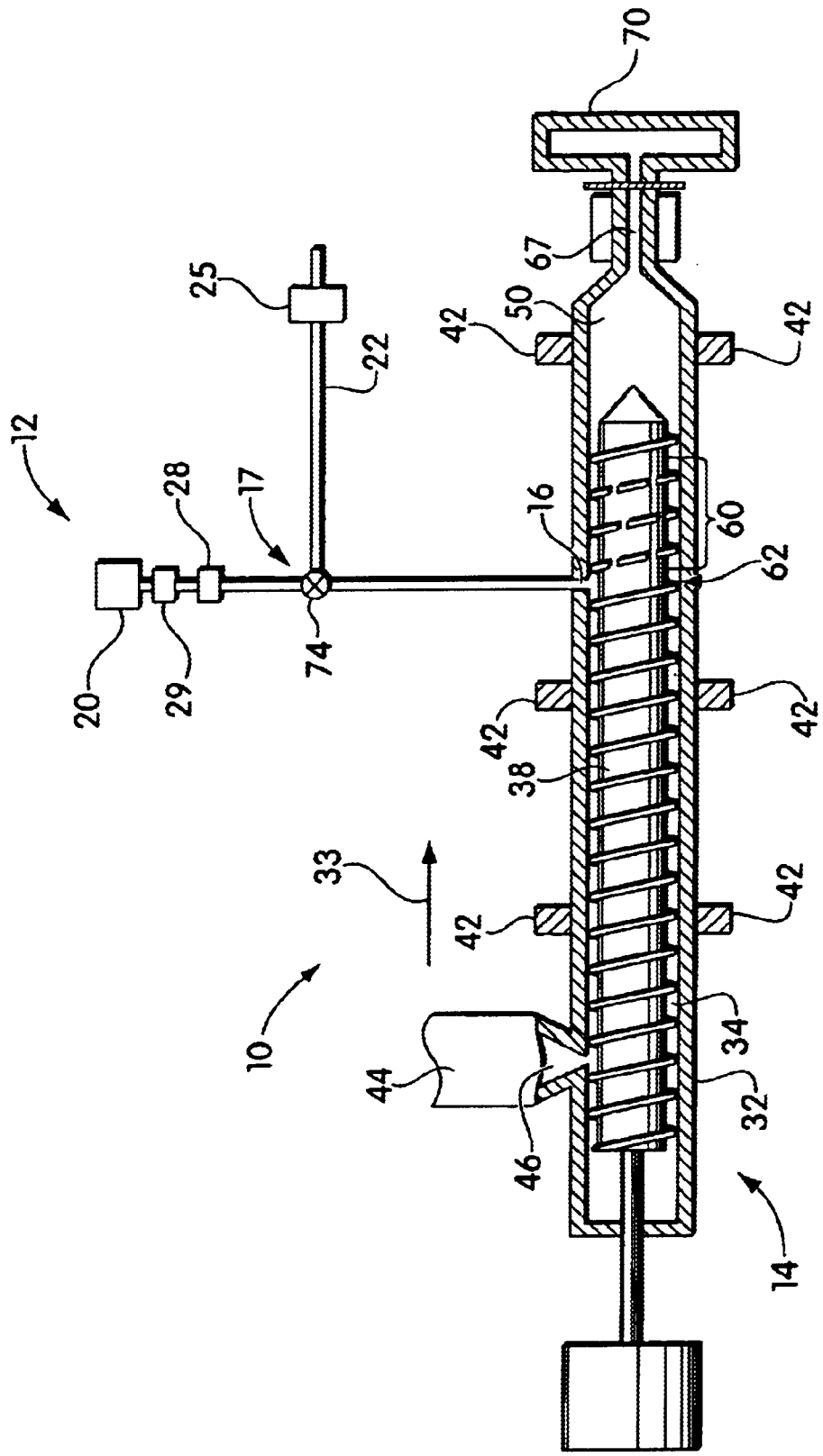
FIG. 4 schematically illustrates another embodiment of the present invention with a single valve for controlling the flow of blowing agent to the bypassing passageway and to the extruder.

An alternative embodiment of the blowing agent delivery system is schematically illustrated in FIG. 4. In the embodiment illustrated, a single, two-way valve 74 replaces bypass valve 30 and valve 31. When in a first position, valve 74 causes the blowing agent to flow through conduit 18 and into the extruder. Valve 74, when in a second position, causes the blowing agent to pass through bypassing passageway 22. As discussed above with respect to other embodiments, valve 74 preferably is as close as possible to the extruder barrel, most preferably essentially adjacent the blowing agent port 16. Although not shown, a check valve generally is provided at port 16 between valve 74 and polymer within the extruder. When valve 74 is located close to or essentially adjacent the extruder, the resulting arrangement is essentially identical to that discussed above with reference to FIG. 1A.

Figure 6:
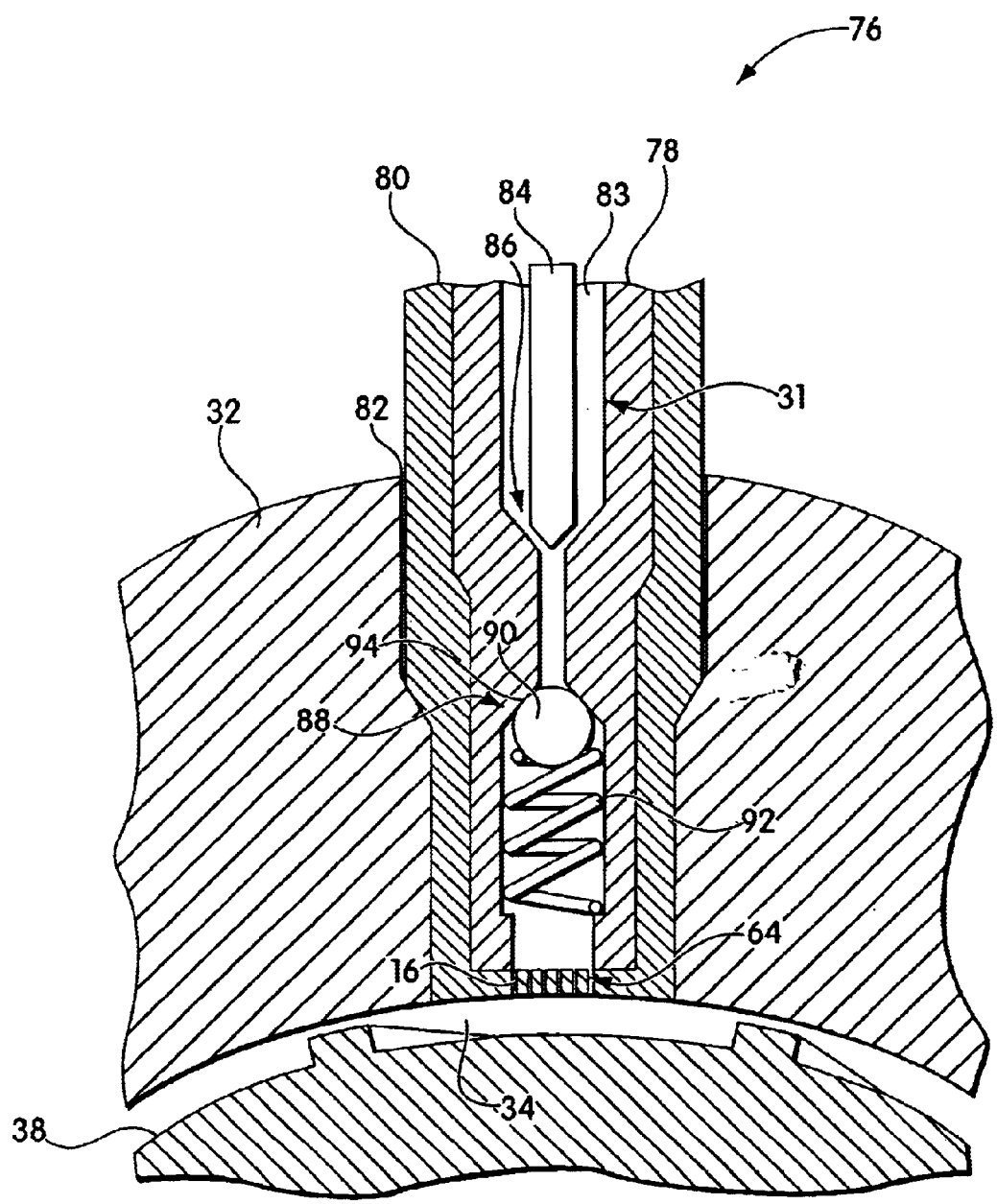
FIG. 6 schematically illustrates a blowing agent injection assembly including a shut-off valve and defining a multi-orifice blowing agent port according to one embodiment of the present invention.

One aspect of the invention involves placing a shut-off valve between blowing agent source 20 and the barrel of the apparatus as close as possible to polymer within the barrel. The shut-off valve can positioned within distances and volume limitations described above from the barrel, and preferably is positioned at least partially within a bore of the barrel as shown in FIG. 6. As one example of this arrangement, referring to FIG. 6, a blowing agent injection assembly 76 includes shut-off valve 31 and defines a multi-orifice blowing agent port 16, including multiple orifices as described above. The combination of the shut-off valve and the blowing agent port in a single assembly permits the shut-off valve to be located proximate to the blowing agent port which, as described above, increases the accuracy of blowing agent delivery by reducing residual blowing agent injected into the polymeric material after the shut-off valve is closed. As illustrated, the valve 31 is part of an injector body 78 that is inserted within an injector sleeve 80 that defines port 16, though other constructions are possible. Assembly 76 is connected to conduit 18 (FIG. 1) and positioned within a bore 82 in barrel 34 of the extruder. An internal passageway 83 extending through injector body 78 provides a fluid pathway for the flow of blowing agent from the conduit to the blowing agent port, when the valve is open. In embodiments that are alternatives to that shown in FIG. 6, shut-off valve 31 is replaced by a two-way valve as shown in FIG. 1A. In this embodiment the two-way valve can, similarly, be located at least partially within the bore of the barrel injection section.

As described above in conjunction with other embodiments of the invention, shut-off valve 31 may have any construction known in the art that selectively permits or prevents the flow of blowing agent therepast. Where two-way valve 31a is used, it may have any construction known in the art that selectively directs blowing agent into the barrel of the extruder or through the bypassing passageway. The illustrated valve includes a valve stem 84 which is actuatable, for example by compressed air, relative to a valve seat 86 to open or close the valve. In the open position (as shown in FIG. 6), the valve stem is separated from the valve seat to provide a pathway that permits blowing agent to flow through the valve. In the closed position, the valve stem contacts the valve seat thereby creating a seal that prevents the flow of blowing agent therepast. The operation of the shut-off valve in this embodiment may be coupled to the operation of the bypassing shut-off valve 30 and/or the position of the screw, as described above.

Injector body 78 also may optionally include a back-flow valve 88 positioned between the shut-off valve and the blowing agent port to prevent polymeric material in the extruder from flowing upwards into the shut-off valve. The check valve is preferably positioned as close as feasible to the polymer and the shut-off valve is preferably positioned as close as feasible to the check valve. This arrangement is included in the definition of "essentially adjacent" the barrel port. As illustrated, the back-flow valve includes a ball check 90 which is upwardly biased and held in position by a spring 92, though other valve constructions may also be used. Typically, when the shut-off or two-way valve is open, the pressure of the blowing agent forces the ball check 90 away from a sealing surface 94 to provide a pathway for blowing agent flow to port 16. However, in some cases, such as when the valve is closed or when the pressure of polymeric material in the polymer processing space in the vicinity of the blowing agent port exceeds the blowing agent injection pressure (e.g. during rapid pressure spikes in the extruder), the ball check may be forced against sealing surface 94 to create a seal. The seal prevents molten polymeric material from flowing through and, potentially, solidifying within the shut-off or two-way valve which may impede its operation, for example, by preventing the shut-off valve from closing.

The systems of the invention allow injection of blowing agent into polymer processing apparatus discontinuously. Injection can be made to occur as a function of a variety of factors in polymer processing apparatus including, but not limited to, screw position, screw mode (plasticating or injecting), time during charge (shot) building or accumulation mode, or the like, or any combination thereof, with a time-based injection control system being preferred. Time-based control over discontinuous injection provides the best control over the precise mass of blowing agent injected into the system at a given stage of operation.

It should be understood that in other embodiments, the blowing agent injection assembly may not include a back-flow valve. Also, in embodiments that do not include a blowing agent injection assembly, such as the embodiment of FIG. 1, a back-flow valve may be provided between the blowing port and the shut-off valve.

Those skilled in the art would readily appreciate that all parameters listed herein are meant to be exemplary and that actual parameters would depend upon the specific application for which the vast delivery systems of the invention are used. It is, therefore, to be understood that the foregoing embodiments are presented by way of example only and that, within the scope of the appended claims equivalents thereto, the invention may be practiced otherwise than as specifically described.

What is claimed:

1. A system for injecting a blowing agent into polymeric material within a barrel of a polymer processing apparatus, wherein the polymer processing apparatus includes a screw mounted in the barrel and designed to reciprocate from an accumulation position, in which the screw plasticates polymeric material that accumulates downstream of the screw, and an injection position, in which the screw does not plasticate polymeric material and the accumulated polymeric material is injected through an outlet of the barrel, the system comprising:

a conduit having an inlet connectable to a source of blowing agent and an outlet connectable to a port in the barrel to provide a pathway through which blowing agent flows from the source to the polymeric material within the barrel; and a flow controlling system including a bypassing passageway fluidly connected to the conduit at a position between the inlet and the outlet, the flow controlling system designed to selectively direct blowing agent flowing from the source to the polymeric material within the barrel through the bypassing passageway when the screw is in the injection position.

2. The system of claim 1, wherein the flow controlling system comprises a valve.

3. The system of claim 2, wherein the valve is positioned at a junction of the conduit and the bypassing passageway and is switchable between a first position directing flow from the source to the barrel and a second position directing flow from the source to the bypassing passageway.

4. The system of claim 2, wherein the flow controlling system further comprises a back-pressure regulator.

5. The system of claim 3, wherein the flow controlling system further comprises a back-pressure regulator located in the bypassing passageway downstream of the valve.

6. The system of claim 4, wherein the back-pressure regulator is designed to maintain a back pressure approximately equal to the pressure of the polymeric material proximate the blowing agent port when a screw rotates in the barrel to plasticate the polymeric material.

7. The system of claim 5, wherein the back-pressure regulator is designed to maintain a back pressure approximately equal to the pressure of the polymeric material proximate the blowing agent port when a screw rotates in the barrel to plasticate the polymeric material.

8. The system of claim 7, wherein the back-pressure regulator is designed to maintain a back pressure of between about 500 psi and 4000 psi.

9. The system of claim 1, wherein an outlet of the bypassing passageway opens to atmosphere.

10. The system of claim 1, wherein an outlet of the bypassing passageway is connected to a recovery container.

11. The system of claim 1, wherein an outlet of the bypassing passageway is connectable to the source of blowing agent.

12. The system of claim 1, wherein the flow controlling system comprises two valves, a first valve in the conduit downstream of a junction of the bypassing passageway and the conduit, and a second valve in the bypassing passageway downstream of the junction.

13. The system of claim 12, including a controller that switches the first valve to an open position when the second valve is closed, and switches the second valve to an open position when the first valve is closed.

14. The system of claim 12, further comprising a back-pressure regulator located in the bypassing passageway downstream of the second valve.

15. The system of claim 13, further comprising a back-pressure regulator located in the bypassing passageway downstream of the second valve.

16. The system of claim 1, wherein the flow controlling system comprises a valve in the conduit downstream of a junction of the conduit and the bypassing passageway, and a back-pressure regulator in the bypassing passageway downstream of the junction.

17. The system of claim 1, wherein the flow controlling system comprises a shut-off valve, and a fluid pathway distance from the shut-off valve to the port in the barrel is no more than 3 inches.

18. The system of claim 17, wherein the fluid pathway distance from the shut-off valve to the port in the barrel is no more than 1 inch.

19. The system of claim 17, wherein the shut-off valve is located essentially adjacent to the port in the barrel.

20. The system of claim 19, wherein the flow controlling system further comprises a second valve located in the bypassing passageway downstream of the junction.

21. The system of claim 19, wherein the flow controlling system further comprises a second shut-off valve in the bypassing passageway downstream of the junction and a back-pressure regulator in the bypassing passageway downstream of the second valve.

22. The system of claim 19, wherein the flow controlling system further comprises a back pressure regulator in the bypassing passageway downstream of the junction.

23. The system of claim 19, further comprising a check valve between the shutoff valve and the port.

24. The system of claim 23, wherein the flow controlling system further comprises a second valve located in the bypassing passageway downstream of the junction.

25. The system of claim 23, wherein the flow controlling system further comprises a second shut-off valve in the bypassing passageway downstream of the junction and a back pressure regulator in the bypassing passageway downstream of the second valve.

26. The system of claim 23, wherein the flow controlling system further comprises a back pressure regulator in the bypassing passageway downstream of the junction.

27. The system of claim 1, wherein the flow controller system comprises a shut-off valve, wherein an enclosed volume between the shut-off valve and the port in the barrel is less than 0.50 cubic inches.

28. The system of claim 27, wherein the enclosed volume between the shut-off valve and the port in the barrel is less than 0.10 cubic inches.

29. The system of claim 1, wherein the flow controlling system comprises a shut-off valve at least a portion of which is positioned within a bore in the barrel.

30. The system of claim 1, wherein a fluid pathway distance from the bypass valve to the port in the barrel is no more than 5 feet.

31. The system of claim 1, wherein a fluid pathway distance from the bypass valve to the port in the barrel is no more than 1 foot.

32. The system of claim 1, wherein the source of blowing agent continuously supplies blowing agent to the inlet of the conduit.

33. The system of claim 1, wherein the source of blowing agent supplies blowing agent to the inlet of the conduit at a flow rate of less than about 60 lbs/hour.

34. The system of claim 1, further comprising a metering device associated with the conduit, positioned between the source of blowing agent and the barrel port, the metering device constructed and arranged to control the flow rate of blowing agent supplied to the conduit.

35. The system of claim 34, wherein the metering device controls the mass flow rate of blowing agent supplied to the conduit.

36. The system of claim 1, wherein the conduit inlet is connectable to a source of blowing agent that is a gas at ambient conditions.

37. The system of claim 1, wherein the conduit inlet is connectable to a source of blowing agent that is a liquid as delivered to the port in the barrel.

38. The system of claim 1, wherein the conduit inlet is connectable to a source of blowing agent that is a supercritical fluid at conditions in the extruder.

39. The system of claim 1, wherein the blowing agent comprises carbon dioxide.

40. The system of claim 1, wherein the blowing agent comprises nitrogen.

41. The system of claim 1, wherein the polymer processing apparatus comprises a discontinuous plasticating system.

42. The system of claim 41, wherein the polymer processing apparatus comprises an injection molding apparatus.

43. The system of claim 41, wherein the polymer processing apparatus comprises a blow molding apparatus.

44. A system for processing polymeric foam material comprising:
   an extruder including a barrel and a screw designed to rotate within the barrel to convey polymeric material in a downstream direction within a polymer processing space between the barrel and the screw, the extruder having a port in the barrel comprising a plurality of orifices and positioned to introduce a blowing agent into polymeric material in the polymer processing space to allow formation therein of a solution of polymer and blowing agent; and
   a blowing agent injection assembly including a shut-off valve positioned within a sleeve defining the port comprising the plurality of orifices, the a shut-off valve having an inlet fluidly connected to a blowing agent source and an outlet fluidly connected to the port, the shut-off valve designed to selectively permit or prevent the flow of blowing agent therethrough,
   wherein a fluid pathway distance from the shut-off valve to the port in the barrel is no more than 3 inches.

45. The system of claim 44, wherein the shut-off valve is a two-way valve.

46. The system of claim 45, wherein the shut-off valve is switchable between a first position directing flow of blowing agent from the source to the port, and a second position directing flow of blowing agent from the source to a bypassing passageway.

47. The system of claim 45, wherein a fluid pathway distance from the shut-off valve to the port in the barrel is no more than 1 cm.

48. The system of claim 45, wherein the outlet of the shut-off valve is located essentially adjacent to the port in the barrel.

49. The system of claim 45, wherein an enclosed volume between the shut-off valve and the port in the barrel is less than 0.50 cubic inches.

50. The system of claim 45, wherein an enclosed volume between the shut-off valve and the port in the barrel is less than 0.10 cubic inches.

51. The system of claim 45, wherein an enclosed volume between the shut-off valve and the port in the barrel is less than 0.05 cubic inches.

52. The system of claim 45, wherein the blowing agent injection assembly is positioned within a bore in the barrel.

53. The system of claim 44, wherein the shut-off valve comprises a valve stem actuatable relative to a valve seat to selectively permit or prevent the flow of blowing agent therethrough and, the blowing agent injection assembly further comprises a ball check valve positioned within the sleeve between the outlet of the shut-off valve and the port, the ball check valve moveable between an open configuration which permits the flow of blowing agent therethrough to the port and a closed configuration which prevents the flow of molten polymeric material from the polymer processing space therethrough.

54. A blowing agent injection assembly operable with polymer processing apparatus, comprising an inlet and a multi-orifice outlet, the assembly having an internal passageway connecting the inlet to the multi-orifice outlet, the blowing agent injection assembly including a valve coupled to the passageway and positioned within a sleeve defining the multi-orifice outlet, the valve moveable between a first position which permits the flow of blowing agent from the inlet to the outlet through the passageway and a second position which prevents the flow of blowing agent from the inlet to the outlet through the passageway.

55. The blowing agent injection assembly of claim 54, wherein the valve is a two-way valve, wherein the second position directs the flow of blowing agent from the inlet to a bypassing passageway.

56. The blowing agent injection assembly of claim 54, wherein the multi-orifice outlet includes at least 10 orifices.

57. The blowing agent injection assembly of claim 54, further comprising a back-flow restrictor moveable between an open configuration which permits the flow of blowing agent from the inlet to the outlet through the passageway and a closed configuration which prevents the flow of molten polymeric material from the outlet to the inlet through the passageway.

58. The blowing agent injection assembly of claim 54, wherein the back-flow restrictor comprises a ball check valve.

59. The system of claims 58, wherein the valve comprises a valve stem actuatable relative to a valve seat to selectively permit or prevent the flow of blowing agent and, the ball check valve is positioned within the sleeve between the valve and the multi-orifice outlet.

* * * * *